United States Patent [19]
Verat et al.

[11] 3,894,231
[45] July 8, 1975

[54] IMAGE CONVERTER OR INTENSIFIER DEVICE

[75] Inventors: Maurice Verat; Lucien Guyot; Bertrand Driard, all of Paris, France

[73] Assignee: Thomson-CSF, Paris, France

[22] Filed: Nov. 21, 1973

[21] Appl. No.: 417,921

[30] Foreign Application Priority Data
Nov. 28, 1972 France .................... 42260

[52] U.S. Cl. ..................... 250/213 VT; 313/102
[51] Int. Cl. ... H01j 31/50; H01j 39/12; H01j 39/00
[58] Field of Search ......... 250/213 VT; 313/94, 102

[56] References Cited
UNITED STATES PATENTS
2,760,077  8/1956  Longini ..................... 250/213 VT Primary Examiner—James W. Lawrence
Assistant Examiner—T. N. Grigsby
Attorney, Agent, or Firm—Roland Plottel

[57] ABSTRACT

An image converter or intensifier device comprising a flat photocathode which enables the convergence of the photoelectron beam. The photocathode comprises a conductive layer made up of filiform conductor which forms a spiral; on the two ends of the spiral, in operation, a potential difference is maintened, thus providing equipotential surfaces in the neighbourhood of the photocathode which are substantially the same as those produced by a spherical photocathode.

4 Claims, 8 Drawing Figures

PRIOR ART
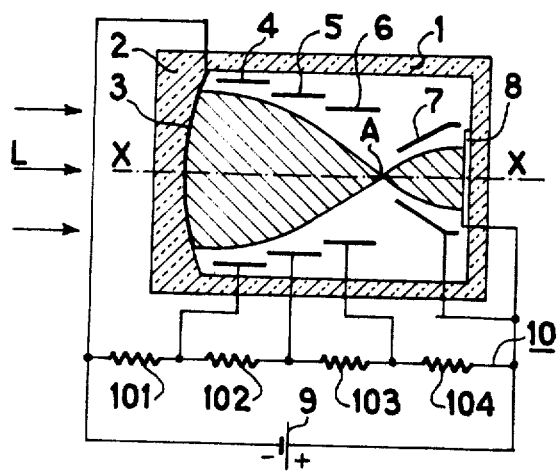
FIG. 1
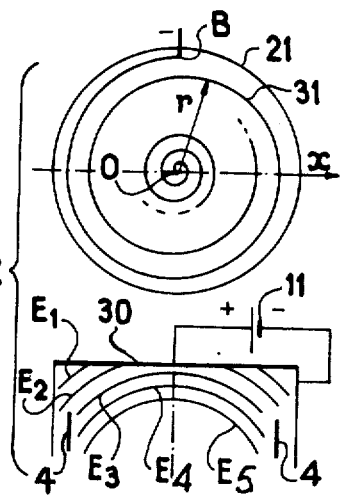
FIG. 2
FIG. 4
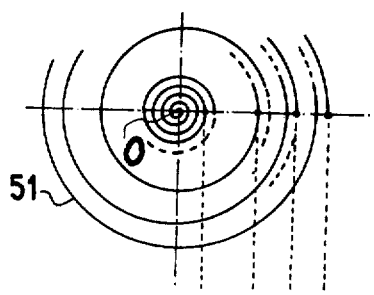
FIG. 3
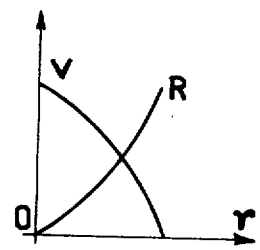
FIG. 5
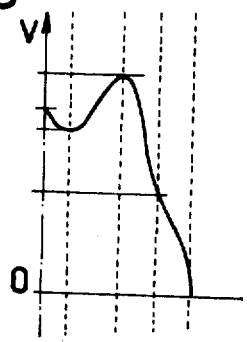
FIG. 7
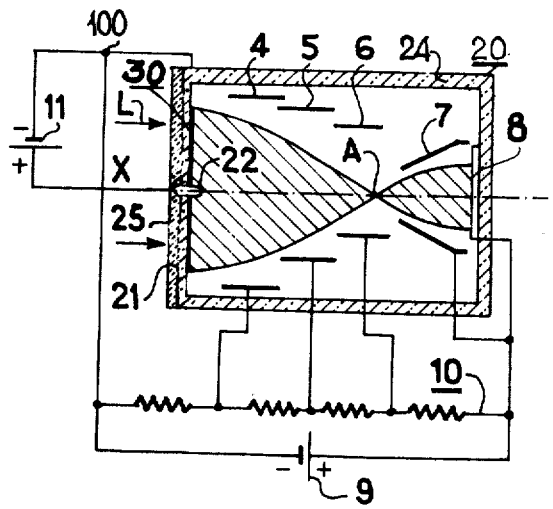
FIG. 6
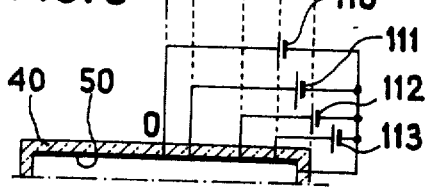

IMAGE CONVERTER OR INTENSIFIER DEVICE

The present invention relates to an improved image converter or image-intensifier.

Image-converter of image-intensifier devices comprise, generally arranged at the two ends of an evacuated enclosure, a photocathode which is exposed to an incident radiation arising from an object or a scene, and emitting electrons, called photoelectrons, under the effect of said radiation, as well as a luminescent screen upon which said photoelectrons impact. Electron-optical means determine the conditions under which said impact takes place and in particular ensure that it involves sufficient energy for the screen to produce a visible light trace. Thus, upon the screen a visible image of the object or the scene in question is formed.

The radiation emanating from the object may either fall within the visible spectrum or be a radiation invisible to the human eye, e.g., x-ray or gamma radiation in particular. The device is referred to as a converter if the incident radiation does not fall within the visible spectrum. The device is referred to as an intensifier in the opposite case, the intensification beeing due to the acceleration imparted to the photoelectrons by means of the electron-optical system.

The dimensions of the luminescent screen upon which the visible image is formed, are generally very much smaller than those of the photocathode so that the electron-optical system has to include means for making the electron beam converge on the screen.

To realize this convergence, in the prior art tubes, photocathodes are provided with a concave surface at the side disposed towards the luminescent screen: the equipotential surfaces near the photocathode then also have this same concavity, thus enabling the convergence of the photoelectrons at their exit from the photocathode.

This kind of concavity, however, is not without drawbacks. For example, if x-ray converters are involved, the point nature of the source gives rise to distortion of the edges of the image formed upon the photocathode by the beam passing through the object, as the result of said concavity; this distortion is the more accentuated the more marked said concavity. In scintillography applications, the source is generally constituted by an organ of the human body into which a radioactive gamma-ray tracer has previously been injected; such a source has substantial dimensions and it is necessary to give the scintillator of the tube dimensions of the same order. However, scintillators, generally iodide monocrystals, have a cost which rises rapidly with the dimension of the scintillator if machining is required in order to give it the aforesaid concave form. This is why in both cases it is sought to utilise flat photo cathodes.

Flat photocathodes of this kind, as used in the prior art, have the drawback, in accordance with the foregoing, that they do not produce the desired convergence of the photoelectron beam at the output of the photocathode: the equipotential surface in the neighbourhood of the photocathode are in this case, in other words, flat like the photocathode itself, and the electron trajectories are substantially perpendicular to these equipotential surfaces and parallel to each other.

Let us remember that a photocathode, considered schematically, comprises a layer of a photoemissive material, that is to say a material having the property of emitting electrons when exposed to a photon stream, and applied on said layer and in electrical contact therewith, an electrically conductive layer which determines the potential on the photocathode, in the tube in which it is used, through which layer the electrons emitted by the photocathode are returned. These two layers are themselves applied on a substrate made of a material which depends upon the nature of the incident photons.

In addition, the electrically conductive layer is usually a continuous layer which completely covers the photo emissive material layer on one of the faces thereof. Sometimes, these two layers are combined in a single layer.

Whatever the case, formed in this fashion, flat photocathodes gives rise to photoelectron beams having parallel trajectories, in the manner herein before described.

In the past, attempts have been made to remedy this drawback by giving the continuous conductive layer a variable thickness and by passing a current through it in order, from the center towards the periphery, at the surface of said layer, to achieve a given potential distribution. See for example "Possibility of Recucing Image Defects in Electron-Optical Imaging Devices Using Electrostatic Lenses" W. Heinmann Advances in Electronics and Electron Physics (Vol. 22. A. 1966 pages 601–607). However, technological difficulties are encountered in the production of this kind of layer for example when it is produced by deposition under vacuum.

In accordance with the present invention, there is provided an image converter or image intensifier device comprising, within an evacuated envelope:

a photocathode comprising an electrically conductive layer and a photoemissive layer, these layers being applied on one another, said photoemissive layer emitting, when operating, photoelectrons under the impact of an incident photo stream, said conductive layer being plane shaped and made of a filiform conductor in the form of a spiral, one of whose ends being located near the center of said photocathode and the other end at the periphery thereof;

a luminescent screen on which said photoelectrons impact;

first means for accelerating said photoelectrons towards said screen;

second means for providing potential differences between different points of said spiral.

For a better understanding of the invention and to show how the same may be carried into effect, reference will be made to the following description and the attached figures, among which:

FIG. 1 is a schematic view of a prior art image intensifier tube;

FIG. 2 is a schematic plan and sectional view showing an embodiment of the conductive layer of the photocathode in an image converter device in accordance with the invention looks;

FIG. 3 is a diagram relating to the foregoing embodiment;

FIGS. 4 and 5 are similar to FIGS. 2 and 3 relating to another embodiment;

FIG. 6 is a figure relating to the two preceding figures;

FIG. 7 is a schematic view of an image convertor device in accordance with the invention;

FIG. 1 illustrates schematically and in section an image converter or image intensifier tube of prior art kind. In this example, the tube is a solid of revolution about the axis XX.

Figure 8:
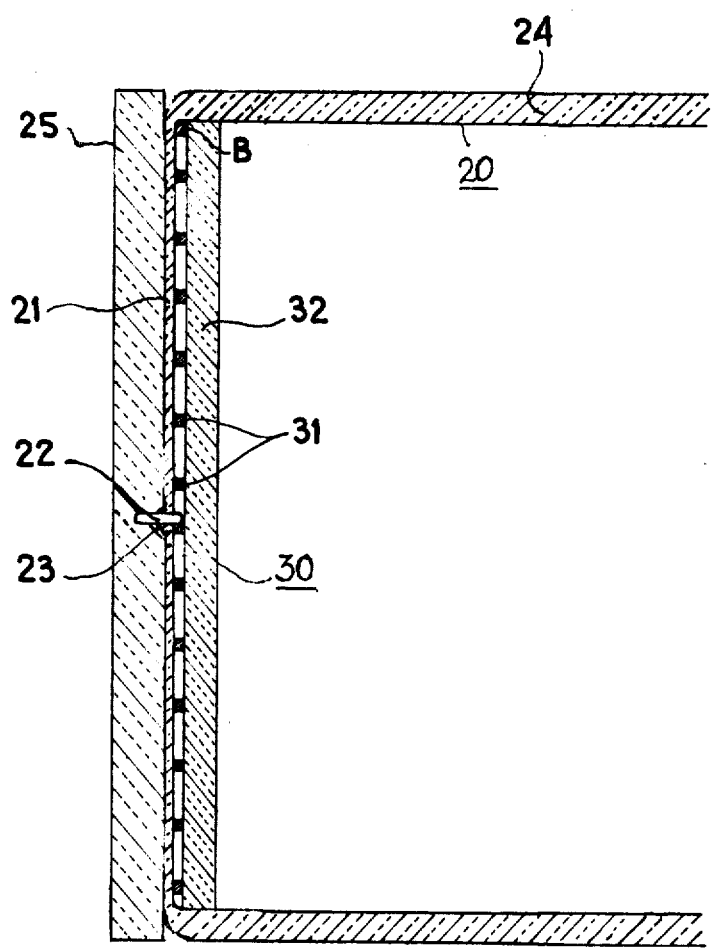
FIG. 8 is a detail fo the preceding figure.

In this figure, the reference 1 designates the evacuated envelope of the tube, made entirely of glass for example, whose terminal face 2 carries the photocathode 3 schematically indicated by a thickened line; references 4, 5, 6 and 7 designate electrodes for controlling the photoelectron beam emitted by the photocathode 3 under the effect of an incident photon stream represented by arrows L; the cross-hatched surface is the section, through the plane of the figure, of the electron beam directed towards a luminescent screen 8. The electrodes 4, 5, 6 and 7 are connected as the figure indicates to a voltage source 9 through the medium of a potentiometer 10 formed by portions 101, 102, 103, 104.

The photocathode 3, in the example shown in the figure, is in the form of a spherical cap having its concave side disposed towards the screen 8; the potential being reckoned from the lowest potential, that is to say that of the surface of the photocathode, the equipotential surfaces, not having been illustrated, are spherical surfaces concentric with the sphere from which said spherical cap is cut. The photoelectron beam issuing from the photocathode 3 and accelerated towards screen 8 by the aforesaid system of electrodes, exhibits a crossover A, and then forms on the screen 8 an image of the different points of the photocathode 3 illuminated by the incident stream L.

In the example shown in the figure, the concavity of the photocathode 3 is essential in order to achieve the desired convergence using the system of electrodes 4, 5, 6 and 7 of the kind shown in the drawing, which is the general kind used in tubes of this sort. Some of the drawbacks resulting from the necessity of producing this concavity, have been seen.

In the example shown in FIG. 1, the photocathode 3 is drawn at the scale of the drawing in the form of a thickened line. It is made up in reality, as has been said, of two continuous layers applied on top of one another, generally produced by the successive deposition upon the terminal face 2 of the envelope, of an electrically conductive material followed by a photo emissive product.

In the image converter or image intensifier devices in accordance with the invention, the same convergence, or a convergence of the same order, is obtained using a flat photocathode. In the devices in accordance with the invention, this convergence is achieved from flat cathodes by giving the electrically conductive layer of the photocathode an appropriate structure. This structure gives the equipotential surfaces in the neighbourhood of the photocathode, the same spherical shape as in the case of a photocathode of spherical cap form such as that shown FIG. 1.

FIG. 2 schematically illustrates an embodiment of such a conductive layer. This takes the form of a filiform conductor 31 arranged spirally on the flat substrate 21 which performs the function of the substrate 2 of FIG. 1.

In the example illustrated, said spiral, only the first and last turns of which have been shown, has a polar radius r which increases, working from the center O, in proportion with the angle subtended in relation to the direction of origin O (Archimedean spiral). The section of the conductor is substantially constant from one end to the other of the spiral.

Calculation shows and experiment confirms that, when a fixed potential difference, provided by a source 11, is maintened between the center O and the extremity B of the spiral, the resistance R between the center O and a point located at a distance r from O, is a parabolical function of that distance r; this is shown on the diagram of FIG. 3. On the contrary, the voltage drop (V) decreases, from O towards the periphery of the spiral, in accordance with a likewise parabolic fuction of the polar radius r; this is also shown FIG. 3.

Under these conditions, when said photocathode is connected in an image converter or image intensifier tube, to the high voltage source 9 in the manner shown in FIG. 1, the potential difference appearing between the points of the photocathode and screen 8, varies from one point of the cathode to another. As a consequence, the equipotential surfaces between cathode and screen in the neighbourhood of the cathode, are no longer flat as in the cathode itself, but curved in the manner indicated in the sectional view of FIG. 2; the surfaces are marked $E_1$, $E_2$, $E_3$, $E_4$ and $E_5$ whilst in the same section, the two vertical lines represent the electrode 4 of FIG. 1. In the section of FIG. 2, the flat photocathode is illustrated schematically by a thick line carrying the reference 30.

An important advantage of the spiral shape given to the filiform conductor 31, is that the variation of the quantity V obtained so, is slow and regular, i.e., without any potential jump, thus enabling the photoelectrons to converge satisfactorily. So it is possible, by adjusting the potential difference along the spiral as trials carried out by the applicants have shown, to obtain using a flat photocathode, equipotential surfaces which are practically identical with those produced by a spherical photocathode of the kind shown FIG. 1.

FIG. 8 shows a practical embodiment of the flat photocathode according to the invention and schematically illustrated on FIG. 2. In FIG. 8, for clarity's sake, the relative dimensions of the elements have not been respected and the number of turns of the spiral have been reduced to just a few.

An evacuated envelope 20 having a cylindrical portion 24 and a disk shaped portion 21, is equipped at the center of the portion 21 with a conductive lead-through 22, using a vacuum tight seal furnished by a sealing material marked 23; on the face of the disk 21 which is towards the interior of the envelope, spiral 31 has been traced in a platinum salt, the spiral having the structure described hereinbefore and being connected at its center with the lead-through 22. The platinum salt is dried by heating it to a suitable temperature, for example during the bonding of the portions 21 and 24 to one another, where these latter consist of two separate components which are attached together to form the envelope 20. After this drying operation, there is left adhering to the disk 21, a colloidal platinum spiral which constitutes the conductive layer of the photocathode for the devices in accordance with the invention. The arrangements required are taken, in accordance with current practice in the building of electronic tubes, in the one hand to connect the end B of the spiral to a lead-through (not shown) bonded to the envelope 20 and on the other hand to provide easy connection to the lead-through 22, in order to be able to apply a potential difference between the two ends of the spiral 31 in operation. In particular, a conductive deposit may be produced upon that face of the disk 21 which is inside the envelope, using the same platinum salt, this at the same time that the spiral itself is deposited, the end B being connected to this lead-through, and a transparant conductive strip may be provided, not visible in the figure, deposited upon the external face of the disk 21 and extending from the lead-trough 22 with it is in contact, to the edge of the envelope 20.

With the assembly connected to a vacuum rig, using known techniques, such as vapourisation, the photo emissive layer 32 is deposited. This layer is constituted by one of the known materials utilised in the art. The assembly of the elements 31 and 32 constitutes the photocathode 30 of the devices in accordance with the invention. On the disk 21 there is applied, as required, a disk shaped scintillator 25.

In one example, in which the disk 21 had a diameter of 300 mm, a spiral of uniform width (dimension of the rectangles 31 of FIG. 8, considered in the radial direction) of 5/10 mm approximately, and a pitch of 4 mm, i.e., the space between two successive turns of the spiral, was used. This spiral had a total resistance between the center and the edge, of some few Megohms. The photoemissive layer 32, some few hundreds of angstroms units in thickness, had a very much higher resistance indeed, of the order of some tens of megohms per unit square, the unit being the one conventionally utilised to measure the resistance of thin films. The beam current, in the trial, was around 100 nanoamperes for a relative voltage between electrode 7 and photocathode, of 30,000 volts. The source 11 supplied a direct voltage of 50 volts.

Under these conditions, test chart images exhibited a very small distortion, certainly not in excess of that encountered when using devices having spherical photocathodes.

FIG. 7 illustrates the prior art tube of FIG. 1, modified in accordance with the embodiment of the invention shown on FIG. 8.

In this figure, the source 11 can be seen; its positive terminal is connected to the lead-through 22, enlarged on this figure, and its negative terminal to the end B (not shown in the figure) of the spiral. Reference 100 is the common point of sources 9 and 11.

FIGS. 4, 5 and 6 illustrate another embodiment of the photocathode used in the devices in accordance with the invention.

Amongst these figures, FIG. 6 schematically illustrates the photocathode 50, indicated by a thickened line, on its substrate 21 and FIG. 4, the design of the conductive film 51 of the photocathode 50, likewise in spiral fashion. In contrast to the arrangments of the preceding example, the spiral 51 is connected at different points to several voltage sources 110, 111, 112 and 113, as the broken-line connections indicate.

FIG. 5 illustrates the voltage drop V produced in the different sections in the spiral 51.

In a general manner, the invention lends itself to embodiments other than those described in the preceding examples. All these forms are comprised within the scope of the invention.

What is claimed is:

1. An image converter or image intensifier device comprising, within an evacuated envelope:
    a photocathode comprising an electrically conductive layer and a photoemissive layer, these layers being applied on one another, said photoemissive layer emitting, when operating, photoelectrons under the impact of an incident photon stream, said conductive layer being plane shaped and made of a filiform conductor in the form of a spiral, one of whose ends being located near the center of said photocathode and the other end at the periphery thereof;
    a luminescent screen on which said photoelectrons impact;
    first means for accelerating said photoelectrons towards said screen;
    second means for providing potential differences between different points of said spiral.

2. A device as claimed in claim 1, wherein said spiral is an Archimedian spiral.

3. A device as claimed in claim 1, wherein said first means include a first direct voltage source connected between said conductive layer and said screen, and said second means include a second direct voltage source, whose the positive terminal is connected to the first of said ends of the spiral and the negative terminal is connected on the one hand to the second of said end of the spiral and on the other end to the negative terminal of said first source.

4. A device as claimed in claim 1, wherein said second means comprise a plurality of direct voltage sources thus providing to a plurality of points of said spiral different potential values.

* * * * *